United States Patent [19]

Kaartinen et al.

[11] Patent Number: 4,780,202
[45] Date of Patent: Oct. 25, 1988

[54] FILTERING UNIT USING A DIAPHRAGM BETWEEN A PAIR OF OPPOSITE GROOVED BACKING SURFACES

[75] Inventors: Niilo Kaartinen, Kuusisto; Teuvo Sorvari, Turku, both of Finland

[73] Assignee: Fluilogic Systems Oy, Finland

[21] Appl. No.: 38,433

[22] Filed: Apr. 14, 1987

Related U.S. Application Data

[63] Continuation of Ser. No. 667,277, Nov. 1, 1984, abandoned.

[30] Foreign Application Priority Data

Nov. 2, 1983 [FI] Finland .................................. 834030

[51] Int. Cl.$^4$ .............................................. B01D 25/30
[52] U.S. Cl. ..................................... 210/247; 210/445; 210/456
[58] Field of Search ................... 210/247, 433.1, 433.2, 210/445, 456

[56] References Cited

U.S. PATENT DOCUMENTS

| | | | |
|---|---|---|---|
| 3,131,143 | 4/1964 | Ferrari | 210/433.2 X |
| 3,495,943 | 2/1970 | Kapff | 210/321.2 X |
| 3,556,302 | 1/1971 | Agranat | 210/445 X |
| 3,560,377 | 2/1971 | Loeffler | 210/433.2 X |
| 3,615,024 | 10/1971 | Michaels | 210/490 |
| 3,853,756 | 12/1974 | Stana | 210/636 |

OTHER PUBLICATIONS

Nose, Yukihiko, "Critical Review of Renal Prostheses", CRC Critical Reviews in Bioengineering, Oct. 1972, pp. 255-271.
Perry, R. H. et al., Chemical Engineers' Handbook, 5th Edition, McGraw-Hill Book Co., N.Y., 1973, pp. 17-37 to 17-39.

Primary Examiner—Frank Spear
Attorney, Agent, or Firm—Lorusso & Loud

[57] ABSTRACT

The invention concerns a filtering unit comprising a filter diaphragm (11), a backing surface (12) disposed against the diaphragm, and passages through which the liquid to be filtered can be supplied on one side of the diaphragm and the liquid that has drained through the diaphragm can be removed from the opposite side of the diaphragm. As taught by the invention, the backing surface (12) is provided with ridges (13) lying side by side and with grooves (14), moving liquid in the direction parallel to the diaphragm (11), between them and which start in the central part of the surface in different directions and lead to the periphery of the surface, curving in such manner that the spacing of mutually adjacent ridges is substantially constant on the entire area of the backing surface. The backing surface (12) will then to the filter diaphragm (11) lend throughout uniform support. When the filtering unit has a backing surface (12) of said kind on both sides of the filter diaphragm (11), the unit may be shaped to be a closed entity in which the filter diaphragm is cleanable after each filtering run by the aid of washing liquid conducted in the direction opposite to the filtering. Such a filtering unit, by which continuously repeated filtrations can be carried out, is particularly appropriate for use as a component in automatically operating equipment.

8 Claims, 1 Drawing Sheet

FILTERING UNIT USING A DIAPHRAGM BETWEEN A PAIR OF OPPOSITE GROOVED BACKING SURFACES

CROSS REFERENCE TO RELATED APPLICATION

This application is a continuation of applicant's copending application Ser. No. 667,227 filed Nov. 1, 1984, which application is now abandoned.

BACKGROUND OF THE INVENTION

The present invention concerns a filtering unit comprising a filter diaphragm, a backing surface placed against the diaphragm, a passage through which the liquid to be filtered can be supplied on one side of the diaphragm, and a channel by which the filtered liquid can be removed from the opposite side of the diaphragm, and said backing surface presenting ridges giving support to the filter and grooves therebetween, through which in connection with filtering the liquid can move parallel to the diaphragm.

Manual filtering practiced on a laboratory scale is usually accomplished with filtering funnels or other equivalent vessels, the filter papers or diaphragms used in them being discardable, that is, single-use. On the side of said vessels such filtering units are used in which the filter diaphragm has been placed between two opposed horizontal backing members and in which the liquid to be filtered can be introduced on one side of the diaphragm and the liquid drained through the diaphragm can be removed from the opposite side of the diaphragm. The said backing members are in most instances nets or gratings having the purpose to afford as uniform support as possible to the filtering diaphragm without in any way impeding the draining of the liquid through the diaphragm.

In a filtering unit known in prior art, the filtering diaphragm has been disposed to rest on a backing surface placed against the diaphragm and in which a spiralling groove has been provided which starts at the centre of the surface and leads to its periphery. In this filtering unit, the liquid to be filtered that has been introduced at the centre of the backing surface will spread along the spiralling groove over the entire area of the diaphragm, while at the same time liquid is drained through the diaphragm to the opposite side thereof. But this design has the drawback that the flow resistance of the long, narrow spiralling groove is high, for which reason the whole filtering unit is unsatisfactory as to its filtering capacity.

The filtering units of prior art mentioned above have the feature in common that discardable, single-use filter diaphragms are used in them. Since the diaphragms are quite low in price, this has not been considered a significant detriment, but it should still be noted that changing the diaphragm after each filtering run constitutes an extra, time-consuming work step. Moreover, in recent time the need has become apparent to develop apparatus which would automatically perform the filtering, and in such types of apparatus provision for changing the filtering diaphragm would quite obviously result in unreasonably complicated designs. There exists therefore a need to provide a filtering unit in which the filtering diaphragm is cleanable between filtering runs and which thereby would be particularly suitable for use as a component in automatically operating filtering apparatus.

SUMMARY OF THE INVENTION

In association with industrial filtering processes taking place on a bulk scale, the principle of so-called counterflow washing of the filter fabric is known, this principle being understood to mean that the filter fabric is subsequent to filtering cleaned by the aid of a washing liquid conducted through the fabric in the opposite direction. However, existing filtering units intended for filtering performed on laboratory scale have been so designed that such counterflow washing is not possible in them. Even if in some instances the washing liquid could be conducted in counterflow through the filter fabric, sufficient cleaning of the diaphragm would not be achieved thereby.

The object of the present invention is to formulate a solution which eliminates the drawbacks, presented above, of filtering units of prior art and which furthermore enables such a filtering unit to be constructed in which the filter diaphragm is cleanable after each filtering run by the aid of a washing liquid conducted in the direction opposite to the filtering. The filtering unit of the invention is characterized in that the backing surface against which the diaphragm is disposed has been provided with ridges running side by side and with grooves therebetween, which start at the centre of the surface radially in different directions and lead to the periphery of the surface with such curvature that the spacing of mutually adjacent ridges is substantially constant over the entire area of the backing surface.

The backing surface of the filtering unit of the invention is characterized in that the backing surface supports the filter diaphragm uniformly over the whole area provided with ridges and grooves of the backing surface. By the circumstance that the ridges and the grooves between them are comparatively short and their number is great is at the same time achieved good filtering capacity, which is based on the fact that the liquid is simultaneously distributed in all the parallel grooves, which spread it efficiently over the whole area of the filter diaphragm.

When a filtering unit is being implemented in which it is possible to clean the filter diaphragm, the unit has to comprise two backing surfaces located on different sides of the filter diaphragm and both provided with parallel curved ridges leading from the central part of the surface to its periphery and with grooves therebetween. Both the liquid to be filtered which is introduced on the filter diaphragm and the washing liquid introduced after filtering on the opposite side of the filter diaphragm can be made to spread through the grooves efficiently over the entire area of the filter diaphragm. Specifically the efficient spreading of the washing liquid over the diaphragm is a condition for successful countercurrent washing accomplished with the liquid.

The input and output passages are to greatest advantage placed so in the filtering unit of the invention that the end of one passage is located in the centre of the backing surface on one side of the filter diaphragm and the end of the other passage is located on the periphery of the backing surface on the opposite side of the filter diaphragm. In that case in principle either of these passages may serve as input passage for the liquid to be filtered while the other passage correspondingly serves as exit passage for the filtered liquid, although the natural design is that in which the liquid is supplied at the centre of the backing surface and its removal is from the periphery of the backing surface. In case the filter unit comprises altogether four input and output passages which have been so disposed that on either side of the filter diaphragm the end of one passage is located at the centre of the backing surface and the end of the other passage on the periphery of the backing surface, the principle according to which the liquid moves from the centre towards the periphery of the filter diaphragm is applicable both in the filtering step and in the subsequent cleaning of the diaphragm.

The filtering unit of the invention in which the filter diaphragm is cleanable is appropriate to be used in automatically operating installations performing repeated filtrations having as their purpose the purifying of a liquid from solid impurities. To be considered are in particular automatic analyzers which are used e.g. in monitoring fermentation processes or in controlling waste water purification. In the first instance, the object of the filtering is removal of yeasts and other biomass from the fermenting solution samples prior to analysis of the samples' chemical composition, while in the second case the filtering is done in order to remove from waste water samples any bacteria, fungi and algae prior to photometric measurement of the contents of nutrients and toxic substances.

The invention is described in the following in greater detail with the aid of an example with reference to the attached drawing.

DESCRIPTION OF THE PREFERRED EMBODIMENT

Figure 1:
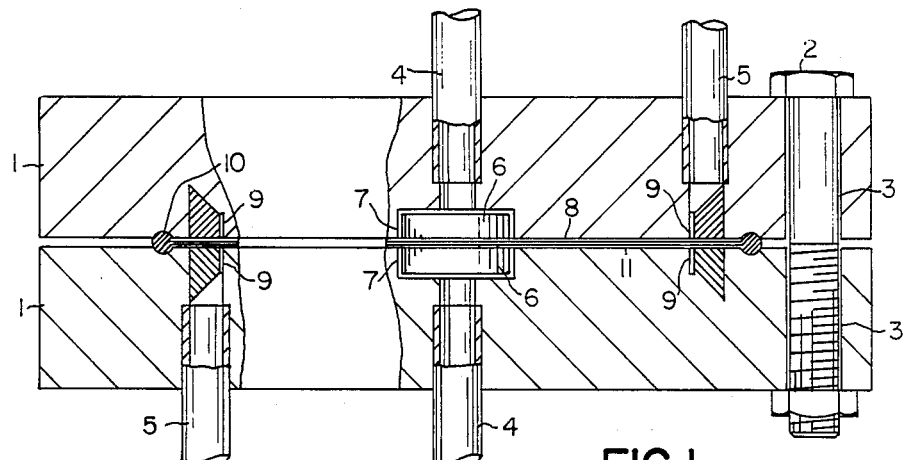
FIG. 1 presents a filter unit according to the invention in elevational view and partly sectioned.
Figure 3:
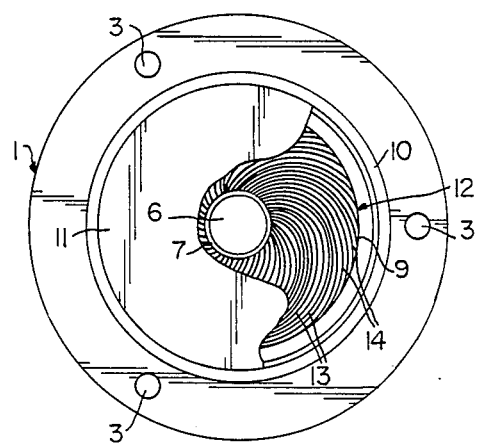
FIG. 3 shows part of the filtering unit of FIG. 1 with its backing surfaces, and the filter diaphragm located thereagainst, in top view.

In FIG. 1 is depicted a filtering unit as taught by the invention, consisting of two body parts 1 placed against each other and fixed to each other with the aid of three fixing screws 2. Apart from the location of the apertures 3 provided for the fixing screws 2, the parts 1 are identical. The location of said apertures can be seen in FIG. 3.

For supplying liquid that is to be filtered into the filtering unit and for removing therefrom the filtered liquid, as well as to the purpose of conducting washing liquid in similar manner through the unit, each body part 1 of the unit has been provided with liquid inlet and outlet passages. Both parts 1 have two passsges, one of them (reference numeral 4 in FIG. 1) having its end in the centre of the part and the other (reference numeral 5 in FIG. 1) having its end close to the outer margin of the part. The end of the passage 4 has been shaped to be a narrow annular gap 7, as viewed in vertical direction encircling the round, fixed part 6, and through which the passage 4 communicates with the intervening space 8 between the body parts, where the filtering takes place. The passage 5, again, terminates in a narrow groove 9 circling around the centre of the body part 1 at a radius consistent with the spacing between the passages 4 and 5, through which groove the passage 5 and the intervening space 8 of the body parts communicate with each other, and which in most cases serves as collecting groove for the liquid that has to be removed from the filtering unit. It should be understood that the unit has been meant to be used mainly in the way that the passages 4 located at the centre of the body parts 1 serve as liquid input passages and the passages 5 located on the periphery of the body parts, as liquid output passages, although the use of these passages in another way is also fully possible, as will be described later on.

Figure 2:
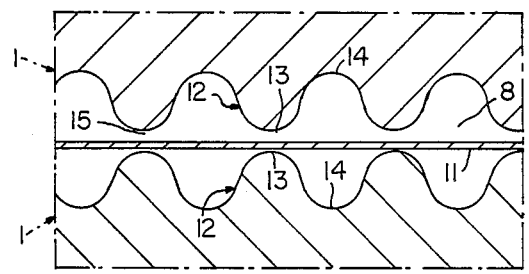
FIG. 2 shows on an enlarged scale part of the backing surfaces belonging to the filtering unit of FIG. 1, and of the filter diaphragm located between them.

The narrow space 8 remaining between the body parts 1 of the filtering unit, which serves as filtering space, borders on the opposed surfaces of the body parts and on the packing ring 10 encircling this space. In the space 8 has been placed a filter diaphragm 11, which may consist e.g. of polyester, polycarbonate, nylon or teflon, by which materials the filtering can be carried out in sterile fashion. The surfaces of the body parts 1 bordering on the space 8 have, between the gap 7 at the end of the passage 4 and the groove 9 connected with the passage 5, been shaped to be backing surfaces 12 lending support to the filter diaphragm 11, their structural design being visible in FIGS. 2 and 3. The backing surfaces comprise, according to FIG. 3, parallel ridges 13 and between them grooves 14, which start in the central part of the surface at the gap 7, radially in different directions, and lead to the periphery of the surface, ending at the groove 9. The ridges 13 and the grooves 14 therebetween have been shaped to be curved in such way that the distance between mutually adjacent ridges is constant over the entire area of the backing surface. This implies that the ridges 13 of the backing surfaces support the filter diaphragm 11 uniformly over its entire area facing the backing surfaces. By the circumstance that the backing surfaces 12 are round has further been achieved that the ridges 13 and grooves 14 on the surfaces all have the same length and thereby the liquid will be uniformly distributed over the filter diaphragm 11. A further feature which can be seen in FIG. 2 is that the distance between the backing surfaces 12 is slightly larger than the thickness of the filter diaphragm 11. Hereby, the diaphragm 11 will during filtering rest against that backing surface which is located behind the diaphragm as viewed in the draining direction and on the front side there remains between the diaphragm and the backing surface a gap 15, which enables the flowing of liquid not only along the grooves 14 but also to some extent past the ridges 13 from one groove to another.

When the above-mentioned filter diaphragm materials enabling sterile filtering to be performed are being used, the spacing of the ridges 13 on the backing surface 12 may not be more than 2.0 mm, and this spacing is preferably between 0.5 and 1.5 mm. The diameter of the backing surface 12 is then preferably on the order of 4–5 cm, whereby the ridges and grooves of the surface will not have excessive length, and the filtering unit is suitable for use in filtering on an analytic scale as far as its size is concerned.

The filtering unit of FIG. 1 may be used e.g. so that the liquid to be filtered is introduced by the passage 4 belonging to the upper body part 1 of the unit into the filtering space 8 between the body parts, where it spreads over that area of the filter diaphragm 11 which is located against the backing surfaces 12. The solid matter contained in the liquid is retained onthe filter diaphragm 11, while the liquid is drained through the diaphragm and ends up in the grooves in the backing surface of the lower body part. These grooves transmit the liquid into the collector groove 9 in the lower body part, whence the liquid departs into the passage 5 of said part. It is prerequisite for filtering to take place as described that a differential pressure exists between said passages 4 and 5 and that any other passages belonging to the unit have been closed. Cleaning of the filtering unit for the next filtering run may hereafter be accomplished by closing said passages used in filtering and opening the passages of the unit which were closed up to now, and by conducting washing liquid by these passages through the unit. It is thus understood that the washing liquid is conducted into the unit by the passage 4 of the lower body part and it is removed after its passage through the filter diaphragm 11, into the passage 5 of the upper body part. In order to ensure positive detachment of the precipitate lodged on the filter diaphragm, it is indicated in the cleaning step touse a comparatively high pressure, that is one which is at least tenfold compared with the pressure employed in filtering (e.g. 1-2 atm). It is moreover possible to enhance the cleaning with compressed air, which may be allowed to flow only past the filter diaphragm—for instance from the passage 4 of the upper body part to passage 5 of this same part.

It should be noted in this connection that what has been presented above only constitutes one example of the use of the filtering unit of the invention. It is thus fully possible to use for liquid input passages, both in the filtering step and in the cleaning step, the passages 5 located on the periphery of the backing surfaces and to use for outlet passages the passages 4 located in the centre of the backing surfaces. Also that is possible that e.g. in the filtering step exclusively the passages 4 located in the centre of the backing surfaces are used, or exclusively the passages 5 located on the periphery of the backing surfaces. On the whole, the passages belonging to the filtering unit afford a multitude of different possibilities in carrying out the filtering and cleaning steps.

As has become evident in the foregoing, the central point in the present invention is continuous use of one and the same filter diaphragm in repeated filtering runs. However, the diaphragm materials which will be used are such that their durability is not unlimited, and in practice one is compelled to replace the diaphragm, owing to wear and tear, at intervals of a few hundred filtering runs. Diaphragm replacement is simply effected by unscrewing the fixing screws 2 of the filtering unit, whereby the filtering space 8 between the body parts is exposed.

It is obvious to a person skilled in the art that different embodiments of the invention are not confined to the examples presented in the foregoing and that they may rather vary within the scope of the claims following below.

We claim:

1. A filtering unit comprising a filter diaphragm, two backing surfaces positioned on opposite sides of and adjacent the diaphragm, a passage having an end located in the center of the backing surface on one side of the filter diaphram, and a passage having an end located on a periphery of the backing surface on the opposite side of the filter diaphram, either one of said two passages being capable of serving as supply passage for the liquid to be filtered while the other passage is serving as an exit passage for the liquid to be drained from the filtering unit, and both of said backing surfaces having a plurality of ridges located side by side with a groove between each two adjacent ridges, the ridges of at least one of the backing surfaces supporting the diaphragm, the liquid in connection with filtering moving through the grooves in a direction parallel to the filter diaphragm, each of said ridges and said grooves starting in the central part of the respective backing surface radially in different directions and leading to a periphery of the respective backing surface, each ridge and groove curving in such a manner that the spacing mutually adjacent ridges is substantially constant over an entire area of the backing surface.

2. Filtering unit according to claim 1, wherein said backing surfaces and the filter diaphragm located there between are round and the ridges and grooves on the backing surfaces start at a center of the surface and end at a periphery of the surface such that all the grooves are of equal length.

3. Filtering unit according to claim 1, wherein a distance between the backing surfaces is greater than the thickness of the filter diaphragm, the diaphragm during filtration resting against one of the two backing surfaces.

4. Filtering unit according to claim 1, wherein input and output passages have been so disposed that an end of one of said input and output passages is located in the center of the backing surface on one side of the filter diaphragm and an end of another of said input and output passages is located on a periphery of the backing surface on the opposite side of the filter diaphragm, whereby any one of said input and output passages may serve as a supply passage for the liquid to be filtered while the other passages serves as exit passage for liquid to be drained from the filtering unit.

5. Filtering unit according to claim 4, which comprises four input and output passages disposed so that on either side of the filter diaphragm the end of one passage is located in the center of the backing surface and the end of the other passage is located on the periphery of the backing surface, the ridges and grooves on the backing surfaces starting at the passage ends in the center of the backing surfaces and terminating on the periphery of the backing surfaces at collecting grooves for collecting and spreading the liquid which runs around the backing surfaces and to which the ends of the passages on the periphery of the backing surfaces have been connected.

6. Filtering unit according to claim 4 further comprising means for enclosing said filtering unit and means for providing and conducting a washing liquid in a direction opposite to filtration.

7. Filtering unit according to claim 1, wherein the spacing of adjacent ridges on the backing surfaces is not more the 2.0 mm, and the material of the filter diaphragm is selected form the group consisting of polyester, polycarbonate, nylon or polytetrafluoroethylene, by which the filtering can be accomplished in sterile mode.

8. Filtering unit according to claim 7, wherein the spacing of adjacent ridges on the backing surface is 0.5-1.5 mm.

* * * * *